(12) United States Patent
Sakurai

(10) Patent No.: US 6,476,882 B1
(45) Date of Patent: *Nov. 5, 2002

(54) LIQUID-CRYSTAL DISPLAY PANEL AND REPAIR METHOD THEREOF

(75) Inventor: Hiroshi Sakurai, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 26 days.

(21) Appl. No.: 08/891,385

(22) Filed: Jul. 11, 1997

(30) Foreign Application Priority Data

Jul. 11, 1996 (JP) .............................................. 8-181807

(51) Int. Cl.[7] ........................ G02F 1/1333; G02F 1/1343
(52) U.S. Cl. ............................................. 349/55; 349/54
(58) Field of Search ............................... 349/44, 54, 55; 257/59, 72

(56) References Cited

U.S. PATENT DOCUMENTS

| | | | | |
|---|---|---|---|---|
| 4,666,252 A | * | 5/1987 | Yaniv et al. ................. 350/333 |
| 4,938,567 A | * | 7/1990 | Chartier ........................ 349/54 |
| 5,045,753 A | * | 9/1991 | Katayama et al. ............ 349/55 |
| 5,062,690 A | * | 11/1991 | Whetten ........................ 349/55 |
| 5,151,807 A | * | 9/1992 | Katayama et al. ............ 349/55 |
| 5,303,074 A | * | 4/1994 | Salisbury ..................... 349/54 |
| 5,343,216 A | * | 8/1994 | Katayama et al. ............ 349/54 |
| 5,600,460 A | * | 2/1997 | Yamamoto et al. ........... 349/54 |
| 5,734,450 A | * | 3/1998 | Irie et al. ...................... 349/55 |

FOREIGN PATENT DOCUMENTS

| | | |
|---|---|---|
| JP | 2-3023 | 1/1990 |
| JP | 2-73233 | 2/1990 |
| JP | 2-157828 | 6/1990 |
| JP | 2-254419 | 10/1990 |
| JP | 4-283725 | 10/1992 |
| JP | 5-5896 | 1/1993 |
| JP | 5-19294 | 1/1993 |

* cited by examiner

Primary Examiner—William L. Sikes
Assistant Examiner—Dung Nguyen
(74) Attorney, Agent, or Firm—Choate, Hall & Stewart

(57) ABSTRACT

An active-matrix addressing LCD panel is provided, in which a bypass can be readily formed for a broken one of the source/drain bus lines without degrading any display characteristic and without increasing the number of man-hour. A TFT-array substrate of the panel has gate bus lines and source/drain bus lines extending perpendicular to each other, pixel areas defined by the gate and source/drain bus lines, TFTs formed near respective intersections of the gate and source/drain bus lines in the corresponding pixel areas, pixel electrodes formed in the respective pixel areas, and light-shielding layers formed in the respective pixel areas. Each of the source/drain bus lines is overlapped with a corresponding one of the light-shielding layers at first and second locations. The first and second locations are defined in such a way that a bypass for each of the source/drain bus lines is formed by electrically connecting each of the source/drain bus lines to the corresponding one of the light-shielding layers at the associated first and second locations.

6 Claims, 8 Drawing Sheets

LIQUID-CRYSTAL DISPLAY PANEL AND REPAIR METHOD THEREOF

BACKGROUND OF THE INVENTION

1. Field of the Invention

The present invention relates to a Liquid-Crystal Display (LCD) and more particularly, to an active-matrix addressing LCD panel including a Thin-Film Transistor (TFT)-array substrate, and a method of repairing any breaking or disconnection in the source/drain bus lines arranged on the TFT-array substrate.

2. Description of the Prior Art

A TFT-array substrate of an LCD panel has a large number of TFTs, a large number of bus lines for the TFTs, and their relating components or members. However, only one of the TFTs and its neighboring bus lines and components or members are explained in this specification and or drawings attached for the sake of simplification of description.

A conventional method of fabricating a TFT-array substrate of an LCD panel is shown in FIGS. 1A to 1D.

First, a metal layer (not shown), which is typically made of a metal such as chromium (Cr), molybdenum (Mo), or aluminum (Al), or their alloy, is formed on a glass plate 102 to have a thickness of several hundreds nanometers. A photoresist is coated on the metal layer thus formed by spin coating, thereby forming a photoresist layer (not shown) on the metal layer.

The photoresist layer is exposed selectively to light using a mask (not shown) with a specific pattern and then, is developed using an alkaline aqueous solution. This, the pattern on the mask is transferred onto the photoresist layer.

Subsequently, using the patterned photoresist layer as a mask, the underlying metal layer is selectively etched to form a gate bus line 110, a rectangular gate electrode 111, and rectangular light-shielding layers 150 and 151 on the glass plate 102, as shown in FIG. 1A.

The gate electrode 111 is formed to be integrated with the gate bus line 110. The light-shielding layer 150 and 151, which are located apart from each other, are separated from the gate bus line 110. After the etching process is completed, the patterned photoresist layer is removed.

The light-shielding layers 150 and 151 are provided on the TFT-array substrate for the purpose of increasing the aperture ratio of the LCD panel.

Further, an insulating layer (not shown) with a thickness of several hundreds nanometers is deposited on the glass plate 102 to cover the gate bus line 110, the gate electrode 111, and the light-shielding layers 150 and 151 by Chemical Vapor Deposition (CVD). A part of the insulating layer, which overlaps with the underlying gate electrode 111, serves as a gate insulating layer of a TFT Tr.

An amorphous silicon (Si) layer (not shown) with a thickness of several hundreds nanometers is formed on the insulating layer thus deposited by a CVD process. The amorphous silicon layer is then patterned to form a semiconductor island 130. The amorphous silicon layer is entirely overlapped with the underlying gate electrode 111, as shown in FIG. 1B.

Using the same way as that in the previous step of forming the gate bus line 110, a drain bus line 120 and a rectangular drain electrode 126 are formed on the insulating layer by a patterned metal layer with a thickness of several hundreds nanometers, as shown in FIG. 1C. The drain bus line 120 extends perpendicular to the gate bus line 110 and runs through the space between the light-shielding layers 150 and 151. The drain bus line 120 is partially overlapped with the underlying light-shielding layers 150 and 151 through the insulating layer.

The drain electrode 126 is formed to be integrated with the drain bus line 120 in the vicinity of the intersection of the gate and drain bus lines 110 and 120. The drain electrode 126 is overlapped with the underlying gate electrode 111 through the insulating layer. The end of the drain electrode 126 is contacted with the semiconductor island 130.

A transparent, conductive layer (not shown) with a thickness of several tens nanometers, which is made of Indium Tin Oxide (ITO) or the like, is deposited on the insulating layer by sputtering. The transparent, conductive layer is patterned by photolithography and etching to form a transparent pixel electrode 140 and a source electrode 141 on the insulating layer, as shown in FIG. 1D. The pixel electrode 140 is partially overlapped with the underlying light-shielding layer 150 through the insulating layer. The pixel electrode 140 is located in a pixel area defined by the adjoining two gate bus lines 110 and the adjoining two drain bus lines 120 so as to be apart from these gate bus lines 110 and these drain bus lines 120.

The source electrode 141 is formed to be integrated with the pixel electrode 140 in the vicinity of the intersection of the gate and drain bus lines 110 and 120. The source electrode 141 is overlapped with the underlying gate electrode 111 through the insulating layer. The end of the source electrode 141 is contacted with the semiconductor island 130.

The TFT Tr is formed by the gate electrode 111, the gate insulating layer, the drain electrode 126, and the source electrode 141.

The TFT-array substrate thus fabricated is then coupled with a color-filter substrate (not shown) so as to make a fixed small gap therebetween. A liquid crystal is then filled in the gap. Thus, the LCD panel is finished.

Fabrication yield improvement is the most important problem to be solved in LCD fabrication. The fabrication yield tends to decrease due to various causes. "Bus-line breaking or disconnection", which is a typical one of the causes, gives a large effect to the fabrication yield because only one bus-line breaking or disconnection occurring in a LCD panel leads to a "line defect", making the whole LCD panel defective.

Accordingly, to reduce the percent defective due to bus-line breaking, a lot of improved structures have been developed.

An improved structure is disclosed in the Japanese Non-Examined Patent Publication No. 5-19294 published in January 1993, which is schematically shown in FIG. 2. In FIG. 2, the same reference numerals as those in FIGS. 1A to 1D are attached to the corresponding elements and therefore, the description relating to the same or corresponding elements is omitted here for simplification.

As shown in FIG. 2, in the same level as that of the gate bus line 110 and the protruding gate electrode 111, a first conductive layer 112 with a rectangular shape is formed on the glass substrate 102 to be apart from the gate bus line 110. The first conductive layer 112 is located at a position to be partially overlapped with the overlying pixel electrode 140.

In the same level as that of the drain bus line 120 and the protruding drain electrode 126, a protruding part 125 with a rectangular shape is formed on the insulating layer to be integrated with the drain bus line 120. Further, a second conductive layer 127 with a rectangular shape and a source electrode 128 with a rectangular shape are formed on the insulating layer in the level of the drain bus line 120. The second conductive layer 127 is located at a position to be partially overlapped with the underlying first conductive layer 112 and the overlying pixel electrode 140. The source electrode 128 is contacted with the underlying semiconductor island 130 and the overlying pixel electrode 140.

If a breaking or disconnection 60 occurs in the drain bus line 120, a laser beam is irradiated to (a) an overlapped area 170 of the protruding part 125 of the line 120 with the underlying first conductive layer 112, (b) an overlapped area 171 of the second conductive layer 127 with the underlying first conductive layer 112 and the overlying pixel electrode 140, (c) an overlapped area 172 of the drain electrode 126 with the underlying gate electrode 111, (d) an overlapped area 173 of the source electrode 128 with the underlying gate electrode 111, respectively. Thus, the upper and lower layers or regions are electrically connected to each other at the overlapped areas 170, 171, 172, and 173, respectively.

In the same step as that of the above laser-beam irradiation, a laser beam is further irradiated to an area 174 located at the bottom of the gate electrode 111, thereby separating the gate electrode 111 from the gate bus line 110. As a result, a part of the drain bus line 120 is electrically connected to the pixel electrode 140 through the protruding part 125, the first and second conductive layers 112 and 127, and another part of the drain bus line 120 is electrically connected to the pixel electrode 140 through the drain electrode 126, the gate electrode 111, and the source electrode 128. This means that the broken or disconnected drain bus line 120 due to the breaking 60 is bypassed through the pixel electrode 140.

With the improved structure of the LCD panel disclosed in the Japanese Non-Examined Patent Publication No. 5-19294, however, an electric current flows from the broken drain bus line 120 to the pixel electrode 140. Therefore, the pixel corresponding to this pixel electrode 140 will form a bright dot, resulting in a point defect.

This means that the improved structure in the Japanese Non-Examined Patent Publication No. 5-19294 is not prudential for breaking or disconnection repairing.

Anther improved structure is disclosed in the Japanese Non-Examined Patent Publication No. 5-5896 published in January 1993. In this structure, first and second conductive regions are formed on the glass plate, which is in the level of the gate bus line. The first and second conductive regions are located at each side of the gate bus line in the vicinity f the intersection of the gate and drain bus lines. is In the level of the drain bus line, first and second protruding parts of the drain bus line are formed on the insulating layer to be overlapped with the underlying first and second conductive regions, respectively. A third conductive region is formed on the insulating layer in the vicinity of the intersection of the gate and drain bus lines. The third conductive region extends along the drain bus line from the first conductive region to the second conductive region. The third conductive region are overlapped with the underlying first and second conductive regions, respectively.

Thus, a redundant structure formed by the first to third conductive regions is provided near the intersection of the gate and drain bus lines.

If a breaking occurs in the drain bus line near the intersection, a laser beam is irradiated to the overlapped areas of the first and second protruding parts of the drain bus line with the underlying first and second conductive regions, and the overlapped areas of the third conductive region with the underlying first and second conductive regions, respectively. As a result, the broken or disconnected drain bus line is bypassed through the first, second, and third conductive regions.

With the improved structure of the LCD panel in the Japanese Non-Examined Patent Publication No. 5-5896, however, this structure cannot cope with any breaking or disconnection occurring at the locations far away from the gate bus line.

Also, when a breaking occurs in the drain bus line, the redundant structure, which is located near the breaking portion in the same level as that of the drain bus line, tends to be broken. Therefore, this redundant structure is not prudential for breaking repairing.

Further, this redundant structure causes some reduction in aperture ratio and consequently, it will degrade the display characteristics.

Still anther improved structure is disclosed in the Japanese Non-Examined Patent Publication No. 4-283725 published in October 1992. In this structure, a conductive region is formed to be entirely overlapped with the gate or drain bus line through the insulating layer as a redundant structure.

If a breaking or disconnection occurs in the gate or drain bus line at a location overlapping with the redundant structure, a laser beam is irradiated to the overlapped areas of the gate or drain bus line with the redundant conductive region, thereby electrically reconnecting the broken gate or drain bus line through the conductive region. Thus, a line defect can be repaired.

With the improved structure of the LCD panel in the Japanese Non-Examined Patent Publication No. 4-283725, however, the light-shielding layers cannot be formed on the TFT-array substrate by the same metal layer as that for the gate bus line due to this redundant structure. This decreases the aperture ratio, because a black matrix serving as the light-shielding layer needs to be formed on a color-filter substrate with sufficiently large margins corresponding to the possibly overlay accuracy of the color-filter substrate with the TFT-array substrate.

SUMMARY OF THE INVENTION

Accordingly, an object of the present invention is to provide an LCD panel in which a bypass can be readily formed for a broken or disconnected one of the source/drain bus lines without degrading any display characteristic and without increasing the number of man-hour.

Another object of the present invention is to provide an LCD panel having a high repairing capability.

Still another object of the present invention is to provide a repair method of an LCD panel in which a broken or disconnected one of the source/drain bus lines is repaired without degrading any display characteristic and with high repairing capability.

A further object of the present invention is to provide an LCD panel and a repair method thereof that raises the fabrication yield of an LCD panel.

The above objects together with others not specifically mentioned will become clear to those skilled in the art from the following description.

According to a first aspect of the present invention, an LCD panel is provided, which includes a TFT-array substrate.

The TFT-array substrate has a plate, gate bus lines formed on the plate to extend along a first direction, source/drain bus lines formed on the plate to extend along a second direction perpendicular to the first direction, pixel areas formed on the plate and defined by the gate bus lines and the source/drain bus lines, TFTs formed near respective intersections of the gate bus lines and the source/drain bus lines in the corresponding pixel areas, pixel electrodes formed in the respective pixel areas, and light-shielding layers formed in the respective pixel areas.

Each of the TFTs has a gate electrode electrically connected to a corresponding one of the gate bus lines, a pair of source/drain electrodes electrically connected to a corresponding one of the source/drain bus lines and a corresponding one of the pixel electrodes, respectively.

Each of the source/drain bus lines is overlapped with a corresponding one of the light-shielding layers at first and second locations. The first and second location are defined in such a way that a bypass for each of the source/drain bus lines is formed by electrically connecting each of the source/drain bus lines to the corresponding one of the light-shielding layers at the associated first and second locations.

With the LCD panel according to the first aspect of the present invention, each of the source/drain bus lines is overlapped with a corresponding one of the light-shielding layers at first and second locations. The first and second locations are defined in such a way that a bypass for each of the source/drain bus lines is formed by electrically connection each of the source/drain bus lines to the corresponding one of the light-shielding layers at the associated first and second locations.

Accordingly, when a breaking or disconnection occurs in any one of the source/drain bus lines, the broken one of the source/drain bus lines is electrically reconnected through the bypass formed by electrically connecting the broken one of the source/drain bus lines to a corresponding one of the light-shielding layers at the corresponding ones of the first and second locations. This means that a bypass can be readily formed for the broken or disconnected one of the source/drain bus lines.

Also, the light-shielding layers may be formed in the same process as that of forming the gate bus lines. The first and second locations for each of the source/drain bus lines may be formed by simply changing a mask pattern for the source/drain bus lines. Therefore, the number of man-hour is not increased.

Further, since the bypass for the broken one of the source/drain bus lines is formed by using the corresponding one of the light-shielding layers, the light-shielded area of each of the pixel areas is not increased. The light-shielding layers are located in the respective pixel areas on the TFT-array substrate. As a result, the aperture ratio may be kept high. In other words, no degradation occurs in any display characteristic.

Additionally, the bypass can be formed even if a breaking or disconnection occurs at a location far from the intersections of the gate and source/drain bus lines. This means that a high repairing capability is realized.

As a result, because of the above-described reasons, the LCD panel according to the first aspect raises the fabrication yield of an LCD panel.

In a preferred embodiment of the LCD panel according to the first aspect, each of the source/drain bus lines has first and second protruding parts for each of the pixel areas. The first and second protruding parts of each of the source/drain bus lines are formed to laterally protrude from a same side of a corresponding one of the source/drain bus lines to be overlapped with a corresponding one of the light-shielding layers.

The first and second locations are positioned in the first and second protruding parts of each of the source/drain bus lines in a corresponding one of the pixel areas, respectively.

In another preferred embodiment of the LCD panel according to the first aspect, each of the light-shielding layers has first and second protruding parts. The first and second protruding parts of each of the light-shielding layers are formed to laterally protrude from a same side of a corresponding one of the light-shielding layers to be overlapped with a corresponding one of the source/drain bus lines.

The first and second locations are positioned in the first and second protruding parts of each of the light-shielding layers, respectively.

In this case, it is preferred that adjacent two ones of the light-shielding layers for each of the source/drain bus lines are mechanically connected to each other at a location below a corresponding one of the source/drain bus lines.

According to a second aspect of the present invention, a repair method of an LCD panel is provided. The LCD panel includes a TFT-array substrate having the following structure.

The TFT-array substrate has a plate, gate bus lines formed on the plate to extend along a first direction, source/drain bus lines formed on the plate to extend along a second direction perpendicular to the first direction, pixel areas formed on the plate and defined by the gate bus lines and the source/drain bus lines, TFTs formed near respective intersections of the gate bus lines and the source/drain bus lines in the corresponding pixel areas, pixel electrodes formed in the respective pixel areas, and light-shielding layers formed in the respective pixel areas.

Each of the TFTs has a gate electrode electrically connected to a corresponding one of the gate bus lines, a pair of source/drain electrodes electrically connected to a corresponding one of the source/drain bus lines and a corresponding one of the pixel electrodes, respectively.

Each of the source/drain bus lines is overlapped with a corresponding one of the light-shielding layers at first and second locations. The first and second locations are defined in such a way that a bypass for each of the source/drain bus lines is formed by electrically connecting each of the source/drain bus lines to the corresponding one of the light-shielding layers at the associated first and second locations.

The repair method of and LCD according to the second aspect of the present invention has a step of irradiating a laser beam to the first and second locations of a broken or disconnected one of the source/drain bus lines and a corresponding one of the light-shielding layers, thereby forming a bypass for the broken one of the source/drain bus lines with the use of the corresponding one of the light-shielding layers.

With the repair method of and LCD according to the second aspect of the present invention, because of the same reason as that in the LCD panel according to the first aspect, the broken one of the source/drain bus lines is repaired without degrading any display characteristic and with high repairing capability.

As a result, the repair method according to the second aspect raises the fabrication yield of an LCD panel.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Figure 1A:
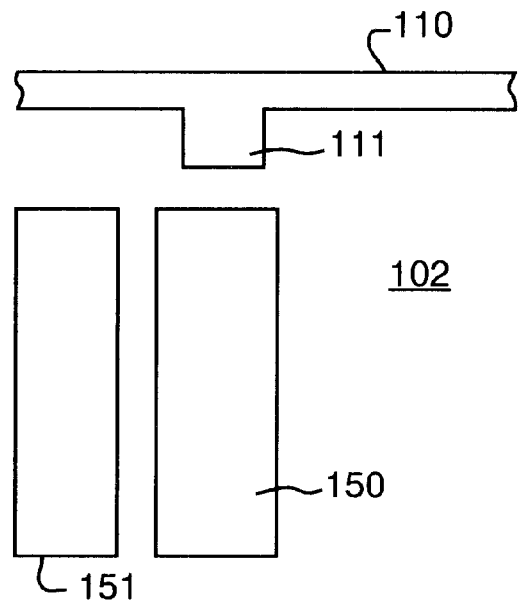
FIGS. 1A to 1D are schematic, partial plan views showing a conventional method of fabricating a TFT-array substrate of an LCD panel, respectively.
Figure 1B:
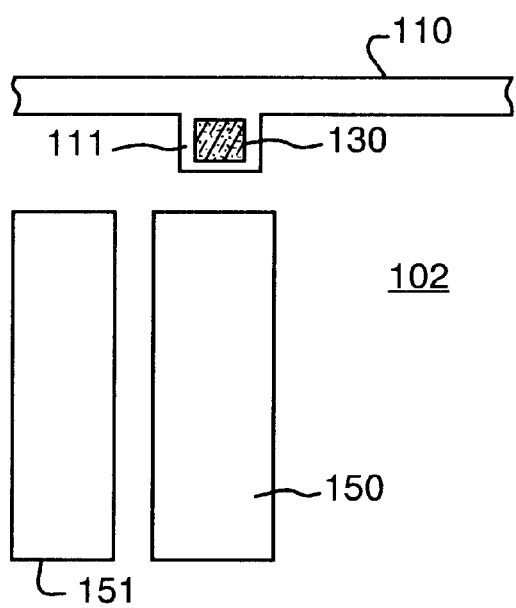
Figure 1C:
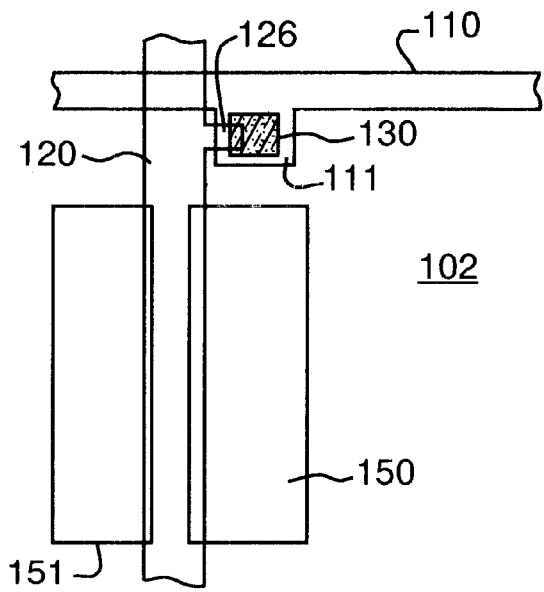
Figure 1D:
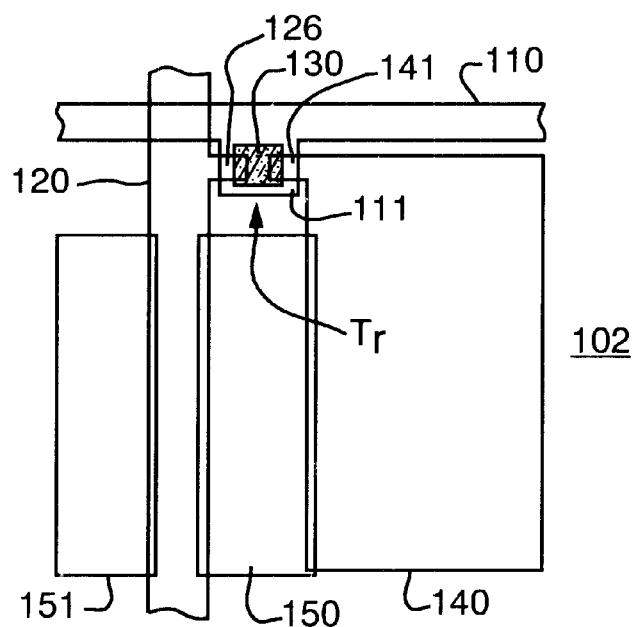
Figure 2:
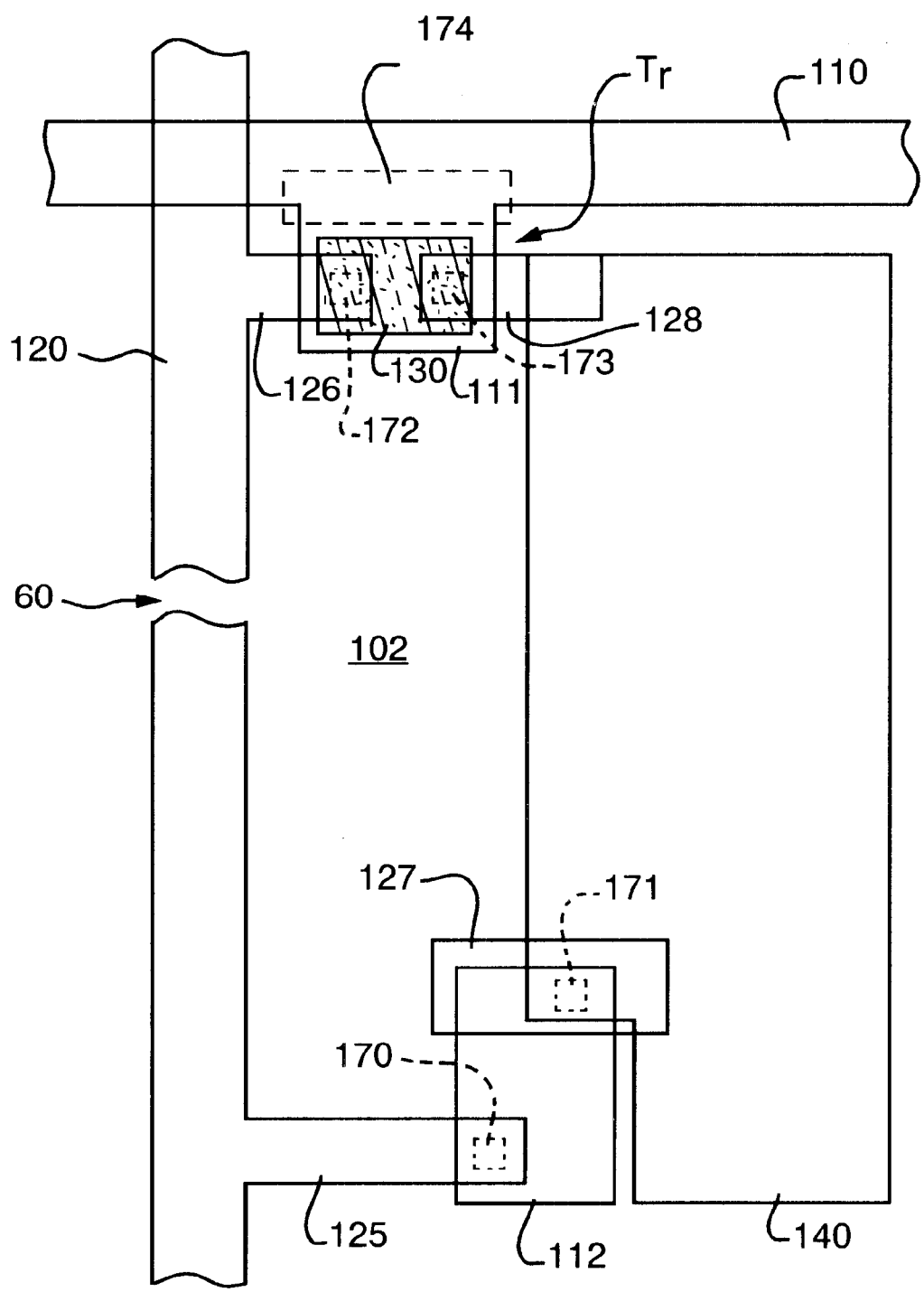
FIG. 2 is a schematic, partial plan view showing a conventional improved structure of a TFT-array substrate of an LCD panel, which is disclosed in the Japanese Non-Examined Patent Publication No. 5-19294.

Preferred embodiments of the present invention will be described below referring to the drawings attached.

First Embodiment

Figure 3:
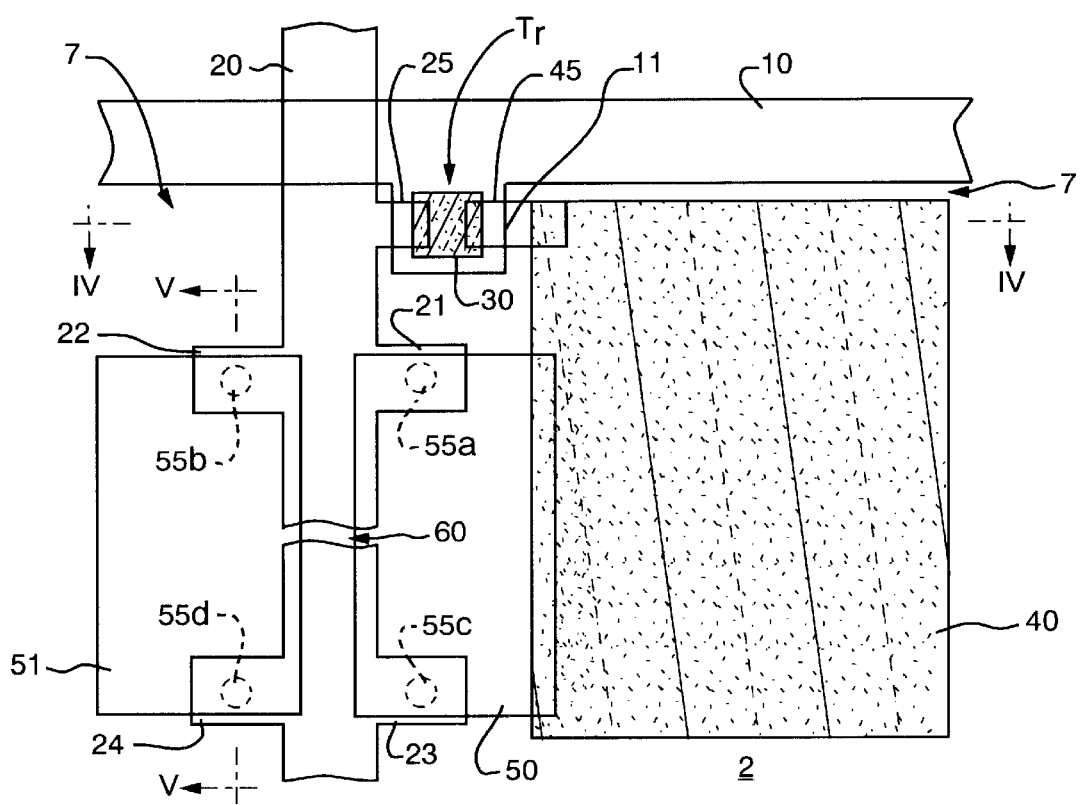
FIG. 3 is a schematic, partial plan view showing the structure of a TFT-array substrate of an LCD panel according to a first embodiment of the present invention.
Figure 4:
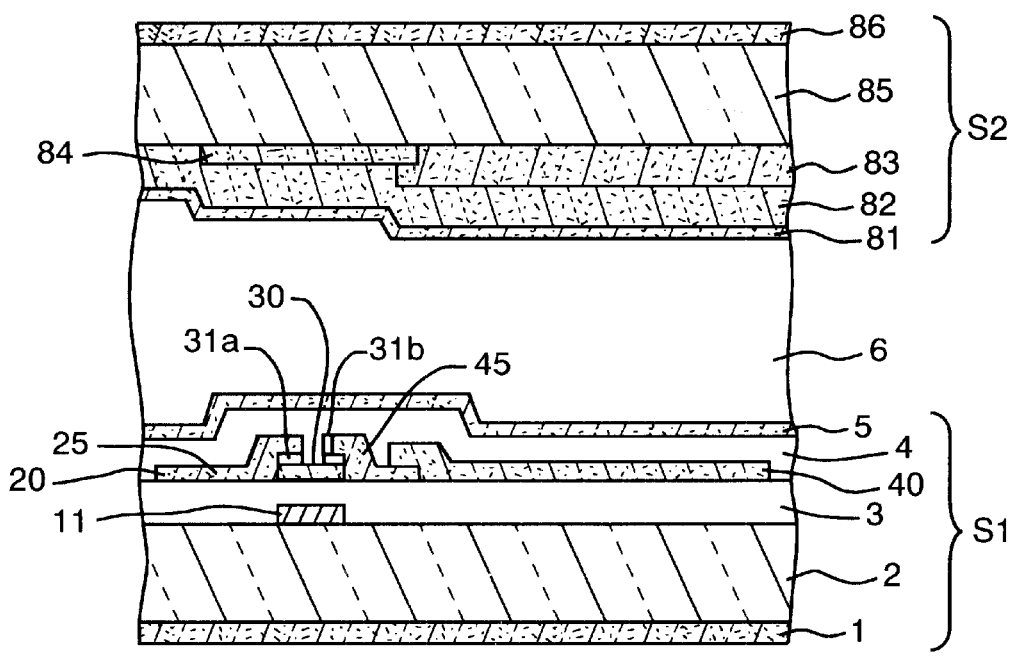
FIG. 4 is a partial cross-sectional view along the line IV—IV in FIG. 3.
Figure 5:
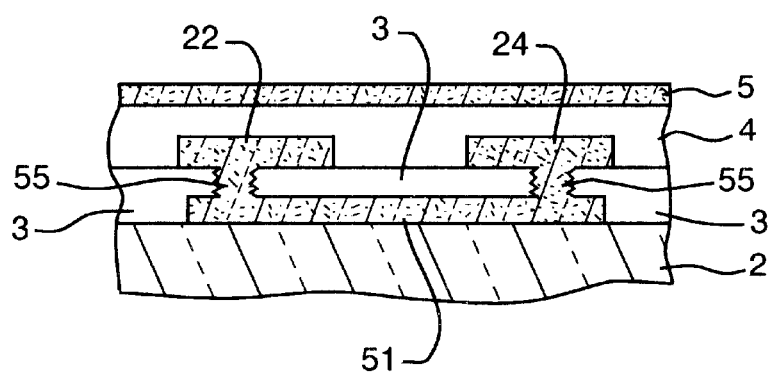
FIG. 5 is a partial cross-sectional view along the line V—V in FIG. 3.

An active-matrix addressing LCD panel according to a first embodiment of the present invention is shown in FIGS. 3 to 5.

As clearly shown in FIG. 4, the LCD panel includes a TFT-array substrate S1 and a color-filter substrate S2.

In the TFT-array substrate S1, a gate bus line 10 with a rectangular gate electrode 11 is formed on an inner surface of a glass plate 2. The gate electrode 11 is formed to be integrated with the gate bus line 10. Rectangular light-shielding layers 50 and 51 are formed on the inner surface of the glass plate 2. The light-shielding layer 50 and 51, which are apart from each other, are separated from the gate bus line 10.

The gate bus line 10, the gate electrode 11, and the light-shielding layers 50 and 51 are made of a patterned chromium (Cr) layer with a thickness of approximately 100 nm.

The light-shielding layers 50 and 51 are provided on the TFT-array substrate SI for the purpose of increasing the aperture ratio of this LCD panel.

Further, a $SiO_x$ layer 3 with a thickness of approximately 200 nm is deposited on the glass plate 2 to cover the gate bus line 10, the gate electrode 11, and the light-shielding layers 50 and 51. The $SiO_x$ layer 3 serves as an interlayer dielectric layer. A part of the $SiO_x$ layer 3, which overlaps with the underlying gate electrode 11, serves as a gate insulating layer of a TFT Tr.

A rectangular semiconductor island 30, which is made of a patterned amorphous silicon (Si) layer with a thickness of approximately 400 nm, is formed on the $SiO_x$ layer 3 to be entirely overlapped with the underlying gate electrode 11.

Drain and source contact layers 31a and 31b, which are made of a patterned amorphous silicon (Si) layer, are formed apart from each other on the semiconductor island 30 to be overlapped with the underlying gate electrode 11.

A drain bus line 20, a rectangular drain electrode 25, and a rectangular source electrode 45, which are made of a patterned chromium (Cr) layer with a thickness of approximately 100 nm, are formed on the $SiO_x$ layer 3. The drain bus line 20 extends perpendicular to the gate bus line 10 and runs through the space between the light-shielding layers 50 and 51. The drain bus line 20 is partially overlapped with the underlying light-shielding layers 50 and 51 through the $SiO_x$ layer 3.

The drain electrode 25 is formed to be integrated with the drain bus line 20 in the vicinity of the intersection of the gate and drain bus lines 10 and 20. The drain electrode 25 is overlapped with the underlying gate electrode 11 through the $SiO_x$ layer 3. The end of the drain electrode 25 is contacted with the drain contact layer 31a to be electrically connected to the semiconductor island 30.

The source electrode 45 is formed to be opposed to the drain electrode 25 in the vicinity of the intersection of the gate and drain bus lines 10 and 20. The source electrode 45 is overlapped with the underlying gate electrode 11 through the $SiO_x$ layer 3. The end of the source electrode 45 is contacted with the source contact layer 31b to be electrically connected to the semiconductor island 30.

A rectangular, transparent pixel electrode 40, which is made of a patterned Indium Tin Oxide (ITO) layer with a thickness of approximately 50 nm, is formed on the $SiO_x$ layer 3. The pixel electrode 40 is partially overlapped with the underlying light-shielding layer 50 through the $SiO_x$ layer 3. The pixel electrode 40 is contacted with the source electrode 45. The pixel electrode 40 is located in a pixel area 7 arranged in a matrix array to be apart from the gate bus line 10 and the drain bus line 20. The pixel area 7 is typically surrounded by the adjoining two gate bus lines 10 and the adjoining two drain bus lines 20.

A TFT Tr is formed by the gate electrode 11, the $SiO_x$ layer 3 serving as the gate insulating layer, the semiconductor island 30 serving as a channel region, the drain electrode 25, and the source electrode 45.

A protection layer 4 is formed on the exposed $SiO_x$ layer 3 to cover the TFT Tr and the drain bus line 20 and the pixel electrode 40. An alignment layer 5 is formed on the protection layer 4.

The color-filter substrate S2 is coupled with the TFT-array substrate S1 so as to make a specific small gap 6 therebetween. The gap 6 is sealed by a sealing material (not shown). A liquid crystal is then filled in the gap 6.

A sheet-like polarizer 1 is attached onto an outer surface of the glass plate 2.

In the color-filter substrate S2, a color-filter layer 83 and a light-shielding layer 84 are formed on an inner surface of a transparent glass plate 85. A common electrode 82 is formed on the inner surface of the glass plate 85 to cover the color-filter layer 83 and the light-shielding layer 84. An alignment layer 81 is formed on the common electrode 82. The liquid crystal stored in the gap 6 is sandwiched by the alignment layers 5 and 81.

A sheet-like polarizer 86 is attached onto an outer surface of the glass plate 85.

The LCD panel according to the first embodiment with the above-described structure may be readily fabricated by a similar method as previously explained in this specification referring to FIGS. 1A to 1D.

As clearly shown in FIG. 3, the drain bus line 20 has four protruding parts 21, 22, 23, and 24. The parts 21 and 23 are located in a side of the line 20 to laterally protruding toward the pixel electrode 40. The parts 22 and 24 are located in an opposite side of the line 20 to the parts 21 and 23 to laterally protruding in an opposite direction to the pixel electrode 40.

The parts 21 and 23 are overlapped with the underlying light-shielding layer 50 in the pixel area 7. The parts 22 and 24 are overlapped with the underlying light-shielding layer 51 in the adjoining pixel area 7.

If the underlying $SiO_x$ layer 3 are selectively broken at two locations 55a and 55c, the protruding parts 21 and 23 of the drain bus line 20 are electrically connected to the underlying light-shielding layer 50, thereby forming a bypass using the light-shielding layer 50. Similarly, if the underlying $SiO_x$ layer 3 are selectively broken at two locations 55b and 55d, the protruding parts 22 and 24 of the drain bus line 20 are electrically connected to the underlying light-shielding layer 51, thereby forming a bypass using the light-shielding layer 51.

When the LCD panel is subjected to a display test where a test pattern is displayed by the panel, the panel is checked whether any breaking or disconnection has occurred in the drain bus line 20 by measuring the resistance of line 20 using probes or by comparing the pattern of the pixels with a standard pixel pattern using a Charge-Couple Device (CCD) camera.

Figure 6A:
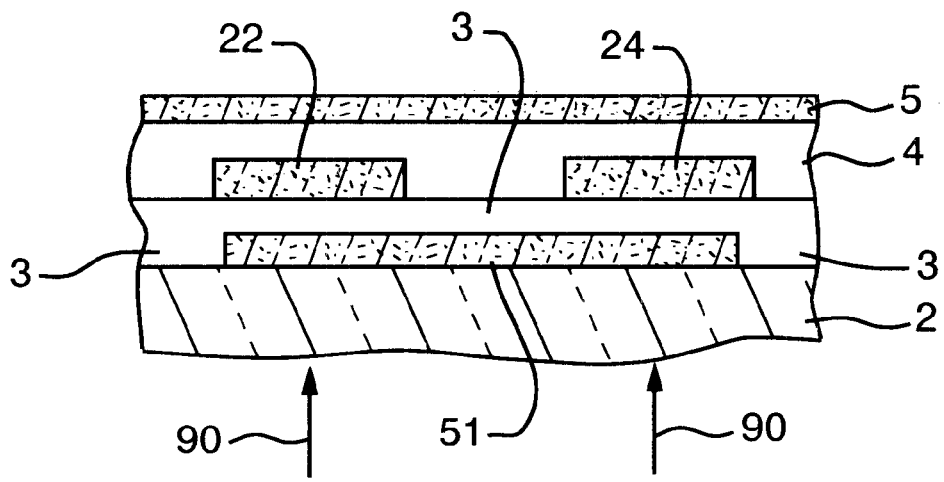
FIG. 6 is a schematic, partial cross-sectional view showing a repair method of the LCD panel according to the first embodiment of the present invention.

If a breaking or disconnection 60 is found in the drain bus line 20, a laser beam 90 is irradiated to the $SiO_x$ layer 3 through the glass plate 2 and the corresponding light-shielding layer 50 or 51 at the locations 55a, 55b, 55c, and 55d, as shown in FIG. 6A. Thus, the $SiO_x$ layer 3 are selectively broken at the locations 55a, 55b, 55c, and 55d. At the same time, the protruding parts 21, 22, 23, and 24 and the corresponding light-shielding layer 50 or 51 are selectively melted at the locations 55a, 55b, 55c, and 55c to be electrically connected to each other.

Figure 6B:
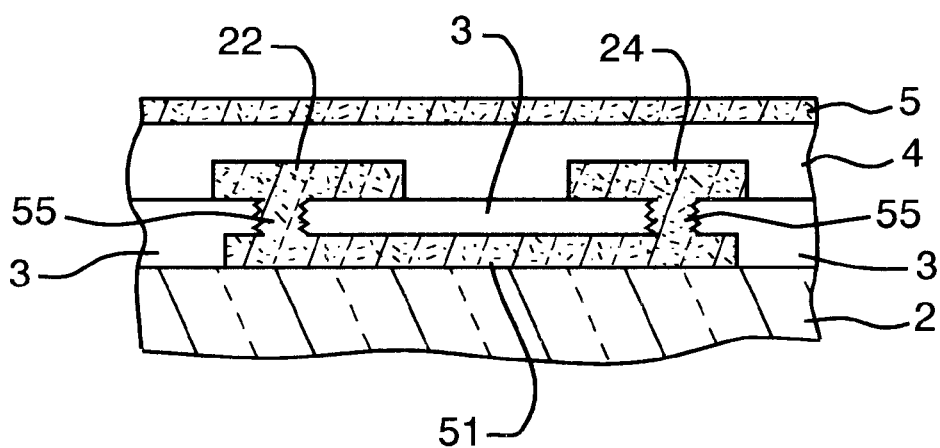

As a result, as shown in FIG. 6B, a bypass is formed by the protruding parts 21 and 23 of the drain bus line 20 and the corresponding light-shielding layer 50, and another bypass is formed by the protruding parts 22 and 24 of the line 20 and the corresponding light-shielding layer 51. This means that the broken or disconnected drain bus line 20 is reconnected by the two bypasses.

With the LCD panel according to the first embodiment of the present invention, each of the drain bus line 20 is overlapped with the light-shielding layer 50 at the locations 55a and 55c and with the light-shielding layer 51 at the location 55b and 55d. Accordingly, even if the breaking or disconnection 60 occurs in one of the drain bus lines 20, the broken one of the drain bus lines 20 is electrically reconnected through the two bypasses by irradiation of the laser beam 90. This means that the bypasses can be readily formed for the broken or disconnected one of the source/drain bus lines 20.

Also, the light-shielding layers 50 and 51 may be formed in the same process as that of forming the gate bus lines 10. The locations 55a, 55b, 55c, and 55d for each of the drain bus lines 20 may be formed by simply changing a mask pattern for the drain bus lines 20. Therefore, the number of man-hour is not increased.

Further, since the bypasses for the broken one of the drain bus lines 20 are formed by using the corresponding two ones of the light-shielding layers 50 and 51, the light-shielding area of each of the pixel areas 7 is not increased. The light-shielding layers 50 and 51 are located in the adjoining two pixel areas 7 on the TFT-array substrate S1. As a result, the aperture ratio may be kept high. In other words, no degradation occurs in any display characteristic.

Additionally, the bypass can be formed even if a breaking or disconnection occurs at a location far from the intersections of the gate and drain bus lines 10 and 20. This means that a high repairing capability is realized.

As a result, because of the above-described reasons, the LCD panel according to the first embodiment raises the fabrication yield of an LCD panel.

The light-shielding layers 50 and 51 are essentially overlapped with the corresponding pixel electrodes 40 and therefore, an unwanted parasitic capacitance between the light-shielding layers 50 and 51 and the corresponding pixel electrodes 40 will become large if the light-shielding layers 50 and 51 are always connected electrically to the corresponding pixel electrodes 40. This large parasitic capacitance will degrade the display performance.

However, in the panel according to the first embodiment, the two bypasses are formed by laser-beam irradiation after any breaking or disconnection of the drain lines 20 has occurred. As a result, the degradation in display characteristic can be suppressed to as a low value as possible.

Further, any breaking or disconnection occurring between the protrusions 21 and 23 or 22 and 24 may be completely repaired and as a result, the percentage defective for the linear defects can be decreased by 50% or more In the first embodiment, the protrusions 21 and 23 and 22 and 24 are located on each side of the drain bus line. However, it is sufficient that only one of the two protrusions 21 and 23 or 22 and 24 is formed.

Second Embodiment

Figure 7:
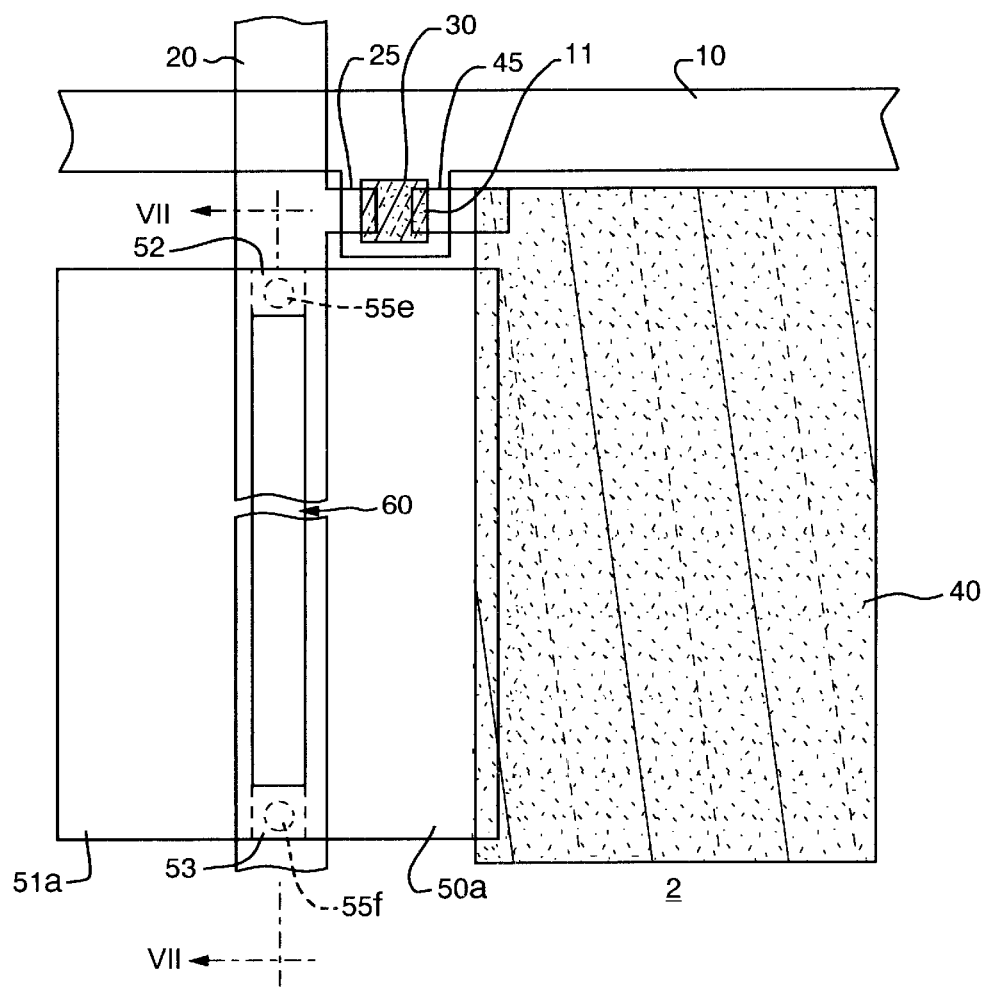
FIG. 7 is a schematic, partial plan view showing the structure of a TFT-array substrate of an LCD panel according to a second embodiment of the present invention.
Figure 8:
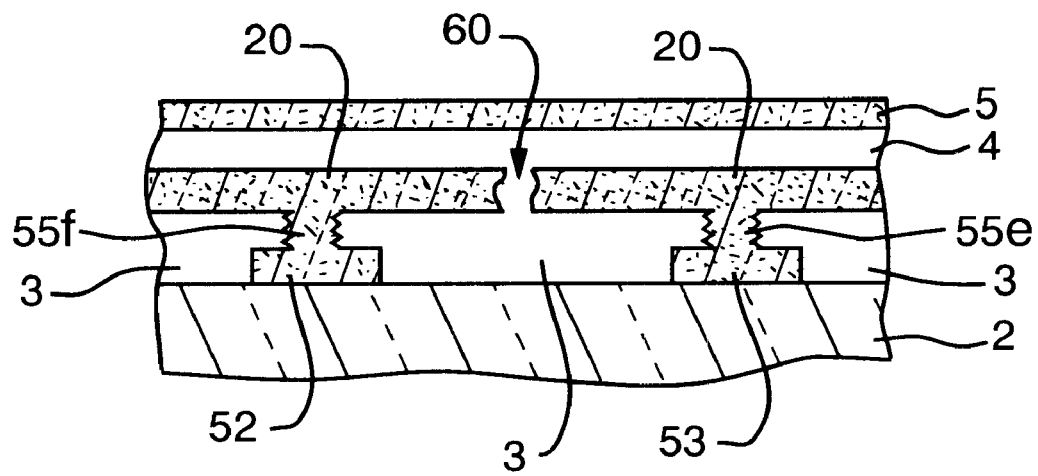
FIG. 8 is a schematic, partial cross-sectional view showing a repair method of the LCD panel according to the second embodiment of the present invention.

FIGS. 7 and 8 show a LCD panel according to a second embodiment of the present invention.

The panel according to a second embodiment has the same configuration as that of the first embodiment except that the drain bus line 20 has no protruding parts and that the light-shielding layers 50 and 51 are mechanically and electrically connected to each other through bridging or interconnecting parts 52 and 53 of light-shielding layers 51A and 51B. The laser beam 90 is irradiated to the locations 55e and 55f where the drain bus line 20 is overlapped with the interconnecting parts 52 and 53, respectively.

With the LCD panel according to the second embodiment of the present invention, each of the drain bus lines 20 as overlapped with the interconnecting parts 52 and 53 of the light-shielding layers 50A and 51A. Accordingly, even if the breaking or disconnection 60 occurs in one of the drain bus lines 20, the broken one of the drain bus lines 30 is electrically reconnected through the two bypasses by irradiation of the laser beam 90. Thus, the SiOx layer 3 is selectively broken at one or more locations, such as 55e and 55f, in a manner previously described in conjunction with the previous embodiment.

Although not explained in detail in this specification, the LCD panels according to the first and second embodiments can be readily fabricated by of the same method as previously explained in this specification referring to FIGS. 1A to 1D.

Although each of the TFTs Tr is of the inverted staggered type in the first and second embodiments, it may be of any other type Each of the source electrodes 45 may be formed to be integrated with a corresponding one of the pixel electrodes 40. Although each of the TFTs Tr is of the inverted staggered type in the first and second embodiments, it may be of any other type.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. An LCD panel including a TFT-array substrate, said TFT-array substrate comprising:

a plate made of a substantially flat transparent dielectric material;

gate bus lines formed in a first conductive patterned layer on said plate to extend along a first direction;

source/drain bus lines formed in a second conductive patterned layer on said plate to extend along a second direction substantially perpendicular to said first direction;

a plurality of pixel areas formed on said plate;

a plurality of TFTs formed near respective intersections of said gate bus line and said source/drain bus lines, each TFT contacting the adjacent one of the plurality of pixel areas, the adjacent gate bus line and the adjacent source/drain bus line;

a plurality of pixel electrodes formed in a third conductive patterned layer disposed over the pixel areas;

light-shielding layers formed in said first conductive patterned layer in a region proximate to said pixel areas, the light-shielding layers not electrically connected to the pixel electrodes;

each of said TFTs having a gate electrode electrically connected to one of said gate bus lines, one of a pair of source/drain electrodes electrically connected to one of said source/drain bus lines and another one of the pair connected to one of said pixel electrodes, respectively;

each of said source/drain bus lines having at least one region which is disposed to overlap at least a part of one of said light-shielding layers at least at first and second locations;

said first and second locations being defined in such a way that a bypass for a portion of each of said source/drain bus lines is formed by electrically connecting each of said source/drain bus lines to corresponding ones of said light-shielding layers at said first and second locations.

2. An LCD panel as claimed in claim 1, wherein each of said source/drain bus lines has first and second extensions proximate to each adjacent one of said pixel areas;

and wherein said first and second extensions of each of said source/drain bus lines are formed to laterally extend from a same side of said source/drain bus lines to have at least one overlap region with one of said light-shielding layers.

3. An LCD panel as claimed in claim 1, wherein each of said light-shielding layers is coupled to first and second protruding parts;

and wherein said first and second protruding parts are formed to laterally extend from a same side of a corresponding one of said source/drain bus lines to be at least partially overlapped with at least one of said light-shielding layers;

and wherein said first and second locations are positioned in said first and second protruding parts, respectively.

4. An LCD panel as claimed in claim 3, wherein further each adjacent two individual ones of said light-shielding layers are physically connected to each other below a corresponding one of said source/drain bus lines so as to form a single light-shielding layer disposed adjacent to two pixel areas, and said source/drain bus line does not have the first and second lateral extensions, and the first and second locations are positioned on the source/drain bus line.

5. A repair method of an LCD panel including a TFT-array substrate, comprising:

said TFT-array substrate having a plate made of a substantially flat transparent dielectric material, gate bus lines formed in a first conductive patterned layer on said plate to extend along a first direction, source/drain bus lines formed in a second conductive patterned layer on said plate to extend along a second direction substantially perpendicular to said first direction, pixel areas formed on said substantially flat transparent plate, TFTs formed near respective intersections of said gate bus line and said source/drain bus lines in said corresponding pixel areas, pixel electrodes formed in a third conductive patterned layer in said respective pixel areas, and light-shielding layers formed in said first conductive patterned layer in a region proximate to said respective pixel areas, the light-shielding layers not electrically connected to the pixel electrodes;

each of said TFTs having a gate electrode electrically connected to a corresponding one of said gate bus lines, a pair of source/drain electrodes electrically connected to a corresponding one of said source/drain bus lines and a corresponding one of said pixel electrodes, respectively;

each of said source/drain bus lines having an overlapped region with at least a part of a corresponding one of said light-shielding layers at first and second locations;

said first and second locations being defined in such a way that a bypass for a portion of each of said source/drain bus lines is formed by electrically connecting each of said source/drain bus lines to corresponding ones of said light-shielding layers at said overlapped first and second locations;

said repair method further comprising:

a step of irradiating a laser beam to said first and second locations of a broken one of said source/drain bus and a corresponding one of said light-shielding layers, thereby forming an electrical bypass for said broken one of said source/drain bus lines with the use of said corresponding one of said light-shielding layer.

6. A repair method as claimed in claim 5, wherein said laser beam irradiates said first and second location through said substantially flat transparent plate of said TFT-array substrate.

* * * * *